(12) United States Patent
Chung

(10) Patent No.: US 10,520,765 B2
(45) Date of Patent: *Dec. 31, 2019

(54) DISPLAY DEVICE

(71) Applicant: SAMSUNG ELECTRONICS CO., LTD., Suwon-si (KR)

(72) Inventor: Deukseok Chung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,153

(22) Filed: Nov. 6, 2018

(65) Prior Publication Data
US 2019/0072815 A1 Mar. 7, 2019

Related U.S. Application Data

(63) Continuation of application No. 15/088,247, filed on Apr. 1, 2016, now Pat. No. 10,126,587.

(30) Foreign Application Priority Data

Sep. 18, 2015 (KR) .................... 10-2015-0132246

(51) Int. Cl.
*G02F 1/1335* (2006.01)
*G02F 2/02* (2006.01)
(Continued)

(52) U.S. Cl.
CPC ....... *G02F 1/133514* (2013.01); *G02B 5/085* (2013.01); *G02B 5/201* (2013.01); *G02B 5/207* (2013.01); *G02F 1/133555* (2013.01); *G02F 2/02* (2013.01); *B82Y 20/00* (2013.01); *G02B 1/002* (2013.01); *G02B 5/0833* (2013.01); *G02B 5/206* (2013.01); *G02B 5/208* (2013.01);
(Continued)

(58) Field of Classification Search
CPC ......... G02F 1/133615; G02F 1/133524; G02F 1/1323; G02B 6/0078; G02B 6/0068
See application file for complete search history.

(56) References Cited

U.S. PATENT DOCUMENTS 4,822,144 A 4/1989 Vriens
7,696,684 B2 4/2010 Weiss et al.
(Continued)

FOREIGN PATENT DOCUMENTS

KR 101376550000 B1 3/2014

OTHER PUBLICATIONS

Extended European Search Report—European Application No. 16182427.1 dated Nov. 8, 2016, citing references listed within.
Search Report for KR Application No. 10-2015-0132246, Filing Date Sep. 18, 2015; Report dated May 26, 2015; 9 pages.

*Primary Examiner* — Phu Vu
(74) *Attorney, Agent, or Firm* — Cantor Colburn LLP

(57) ABSTRACT

An optical stacking structure includes a color filter including a plurality of quantum dots which absorbs a first light and emits at least one of second light and third light that are different from the first light, a first optical filter layer disposed on the color filter, and a second optical filter layer disposed on the opposite side of the first optical filter based on the color filter. The first optical filter blocks at least a part of the first light, and the second optical filter transmits at least a part of the first light and reflects at least a part of the second light and the third light.

23 Claims, 8 Drawing Sheets

(51) Int. Cl.
  *G02B 5/08* (2006.01)
  *G02B 5/20* (2006.01)
  G02F 1/13357 (2006.01)
  B82Y 20/00 (2011.01)
  G02B 1/00 (2006.01)
  G02F 1/21 (2006.01)
  G02B 5/28 (2006.01)

(52) U.S. Cl.
  CPC ........ *G02B 5/283* (2013.01); *G02F 1/133617* (2013.01); *G02F 1/21* (2013.01); *G02F 2001/133521* (2013.01); *G02F 2001/133565* (2013.01); *G02F 2001/133614* (2013.01); *G02F 2202/108* (2013.01); *G02F 2202/36* (2013.01); *G02F 2203/055* (2013.01)

(56) References Cited

U.S. PATENT DOCUMENTS

| | | |
|---|---|---|
| 8,179,034 B2 | 5/2012 | Potts et al. |
| 8,593,590 B2 | 11/2013 | Jung |
| 10,126,587 B2 * | 11/2018 | Chung .............. G02F 1/133514 |
| 2008/0174716 A1 | 7/2008 | Chen et al. |
| 2008/0297705 A1 | 12/2008 | Kuo et al. |
| 2009/0025783 A1 | 1/2009 | Wernham et al. |
| 2013/0242228 A1 | 9/2013 | Park et al. |
| 2014/0132890 A1 | 5/2014 | Zhang |
| 2015/0036217 A1 | 2/2015 | Nakano et al. |
| 2015/0228232 A1 | 8/2015 | Lee et al. |

* cited by examiner

DISPLAY DEVICE

CROSS-REFERENCE TO RELATED APPLICATIONS

This application is a continuation of U.S. patent application Ser. No. 15/088,247, filed on Apr. 1, 2016, which claims priority to Korean Patent Application No. 10-2015-0132246 filed on Sep. 18, 2015, and all the benefits accruing therefrom under 35 U.S.C. § 119, the content of which in its entirety is herein incorporated by reference.

BACKGROUND

1. Field

The disclosure relates to a display device that displays an image.

2. Description of the Related Art

A display device such as a liquid crystal display ("LCD"), a plasma display device, an organic light emitting diode ("OLED") display, and the like are widely used, and in particular, the LCD having characteristics of high visibility, thin thickness, low power consumption, low exothermicity, and the like, is widely used for various devices such as a mobile device, a computer monitor, a television ("TV"), and the like.

The LCD typically includes two display panels including electric field-generating electrodes such as a pixel electrode, a common electrode and the like, and a liquid crystal layer disposed between the two display panels. The LCD displays an image by applying a voltage to the electric field-generating electrodes, generating an electric field in the liquid crystal layer, determining alignment of the liquid crystal molecules of the liquid crystal layer through the electric field, and controlling polarization of incident light.

SUMMARY

An exemplary embodiment provides a display device having improved photo-efficiency and viewing angle relative to power consumption.

An exemplary embodiment of a display device includes a light source which provides a first light, a color filter including a plurality of quantum dots which absorbs the first light and emits at least one of second light and third light, where the second light and the third light are different from the first light, a first optical filter layer disposed on the color filter, where the first optical filter layer blocks at least a part of the first light, and a second optical filter layer disposed between the light source and the color filter, where the second optical filter layer transmits at least a part of the first light and reflects at least a part of the second light and the third light.

In an exemplary embodiment, the color filter may include a first region which emits the first light, a second region which emits the second light, and a third region which emits the third light, and the first optical filter layer may be disposed at a region corresponding to the second region and the third region.

In an exemplary embodiment, the first light may be a blue light, the second light may be a green light, and the third light may be a red light.

In an exemplary embodiment, the first region may include a transparent body.

In an exemplary embodiment, the display device may further include a first substrate and a second substrate disposed opposite to the first substrate, and the first optical filter layer, the color filter and the second optical filter layer may be disposed between the first substrate and the second substrate.

In an exemplary embodiment, the first optical filter layer, the color filter and the second optical filter layer may be sequentially stacked one on another.

In an exemplary embodiment, the display device may further include a liquid crystal layer disposed between the first substrate and the second substrate, and the first optical filter layer, the color filter and the second optical filter layer are disposed on the liquid crystal layer.

In an exemplary embodiment, the quantum dot may include a plurality of first quantum dots which absorbs the first light and emits the second light having a longer wavelength than the first light, and a plurality of second quantum dots which absorbs the first light and emits the third light having a longer wavelength than the first light and the second light.

In an exemplary embodiment, the first quantum dots and the second quantum dots may have different sizes as each other.

In an exemplary embodiment, the first optical filter layer may transmit light having a longer wavelength than the first light, and may block light having a wavelength of less than or equal to about 500 nanometers (nm).

In an exemplary embodiment, the first optical filter layer may have a stacking structure, where the stacking structure includes a first layer having a high refractive index and a second layer having a low refractive index and disposed on the first layer.

In an exemplary embodiment, the number of layers in the stacking structure may be equal to or greater than four.

In an exemplary embodiment, the first layer may have a refractive index in a range of about 1.8 to about 2.6, and the second layer may have a refractive index in a range of about 1.3 to about 1.8.

In an exemplary embodiment, the first layer may include at least one selected from hafnium oxide, tantalum oxide, titanium oxide, zirconium oxide, magnesium oxide, cesium oxide, lanthanum oxide, indium oxide, niobium oxide, aluminum oxide, and silicon nitride.

In an exemplary embodiment, the second layer may include a silicon oxide.

In an exemplary embodiment, the first optical filter layer may include a thin film including a metal, a conductive oxide or a combination thereof.

In an exemplary embodiment, the metal may include at least one selected from aluminum, silver, nickel, and chromium, and the conductive oxide may include at least one selected indium tin oxide, aluminum zinc oxide, gallium zinc oxide, and indium zinc oxide.

In an exemplary embodiment, the second optical filter layer may reflect light having a wavelength of greater than about 500 nm.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

Figure 1:
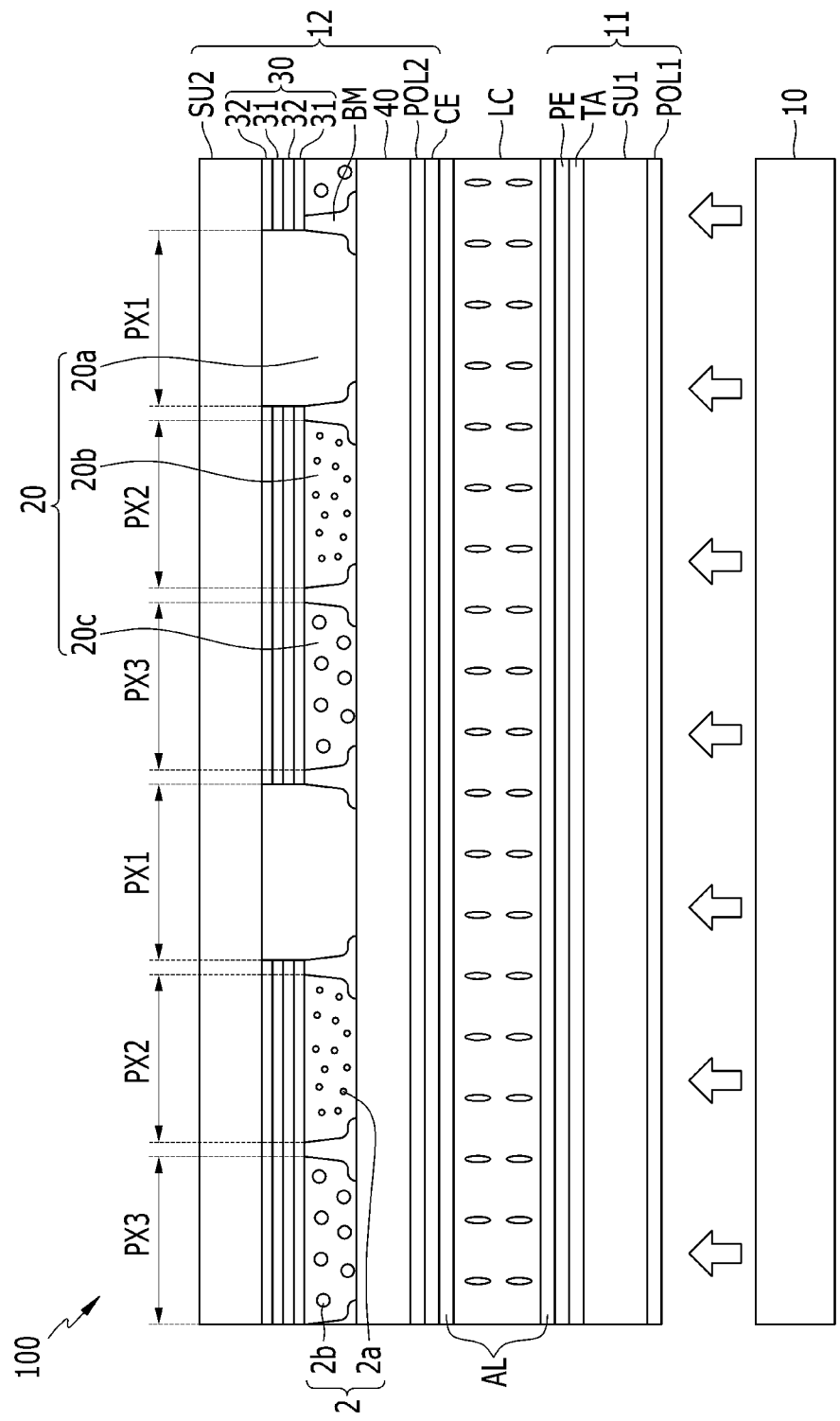
FIG. 1 is a cross-sectional view showing an exemplary embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to the accompanying drawings.

FIG. 1 is a cross-sectional view showing an exemplary embodiment of a display device according to the invention.

Referring to FIG. 1, an exemplary embodiment of a display device 100 includes a light source 10, a lower panel 11 and an upper panel 12.

The light source 10 provides the lower panel 11 and the upper panel 12 with first light. The light source 10 may include a light emitter that emits the first light. In an exemplary embodiment, the first light emitted from the light source 10 may be light in a visible light region, e.g., light having relatively higher energy in a visible light region, for example, a blue light. In such an embodiment, the blue light may be provided to the lower panel 11 and the upper panel 12 as the first light.

The light source 10 may include a light emitting region including a light emitter and a light guide that supplies (or guides to supply) the blue light emitted from the light emitting region toward the lower panel 11. The light emitting region may be positioned on a side of the light guide or beneath the light guide.

The lower panel 11 includes a first substrate (SU1) including or formed of glass, plastic and the like, and a wire layer (TA) including a thin film transistor and disposed on the first substrate (SU1). The wire layer (TA) may include a gate line, a sustain voltage line, a gate insulating layer, a data line, a source electrode, a drain electrode, a semiconductor, a protective layer, and the like. In such an embodiment, the thin film transistor is connected to the gate line and the data line. In such an embodiment, a pixel electrode (PE) is disposed on the wire layer (TA). The structure of the gate line, the data line, the source electrode, the drain electrode, the semiconductor and the pixel electrode may vary in exemplary embodiments.

The gate line and the sustain voltage line are electrically separated or disconnected from each other, and the data line is insulated from and crosses the gate line and the sustain voltage line. The gate electrode, the source electrode and the drain electrode respectively define a control terminal, an input terminal and an output terminal of the thin film transistor. The drain electrode is electrically connected to the pixel electrode (PE).

The pixel electrode (PE) may include or be made of a transparent conductive material of indium tin oxide ("ITO") or indium zinc oxide ("IZO"), and generate an electric field to control arrangement directions of liquid crystal molecules.

An alignment layer (AL) is disposed on the pixel electrode (PE). The alignment layer (AL) may include at least one of polyamic acid, polysiloxane, polyimide, and the like that are generally-used materials for a liquid crystal alignment layer. The alignment layer (AL) may initially arrange or pretilt liquid crystal molecules in the liquid crystal layer (LC). Positions of the alignment layer (AL) may be different set in exemplary embodiments. In exemplary embodiments, the alignment layer (AL) may be disposed over or under the liquid crystal layer (LC). In an exemplary embodiment, as shown in FIG. 1, the alignment layer (AL) may be disposed over and under the liquid crystal layer (LC). Alternatively, the alignment layer (AL) may be omitted.

The liquid crystal layer (LC) is disposed between the lower panel 11 and the upper panel 12. The liquid crystal layer LC may have a thickness in a range of about 5 micrometers (μm) to about 6 μm, for example. Kinds of liquid crystal molecules in the liquid crystal layer LC, or a driving manner of the liquid crystal layer LC, may vary in exemplary embodiments.

A first polarizer POL1 is disposed on (e.g., adhered to) a rear side (a bottom surface or an outer surface) of the first substrate SU1. The first polarizer POL1 may include a polarizing element and a protective layer, and the protective layer may include tri-acetyl-cellulose ("TAC"). In an alternative exemplary embodiment, the first polarizer POL1 may be disposed between the first substrate SU1 and the wire layer TA, or at other positions in the lower panel 11.

A common electrode (CE) is disposed on the liquid crystal layer LC. The common electrode (CE) may include or be made of a transparent conductive material, such as ITO or IZO, and may generate an electric field to control arrangement directions of liquid crystal molecules. A position of the common electrode (CE) may vary in exemplary embodiments. In one exemplary embodiment, for example, the common electrode (CE) may be on the lower panel 11.

The upper panel 12 includes a second substrate (SU2) including or formed of transparent glass, plastic, or the like, and a first optical filter layer 30 disposed on (e.g., below) the second substrate (SU2).

The first optical filter layer 30 may, for example, block light in a part of a visible light wavelength region but pass light in the other wavelength regions. In one exemplary embodiment, for example, the first optical filter layer 30 may block a blue light but pass other light except for the blue light. In one exemplary embodiment, for example, a green light, a red light and/or a yellow light as a combination thereof may be transmitted through the first optical filter layer 30.

Figure 2:
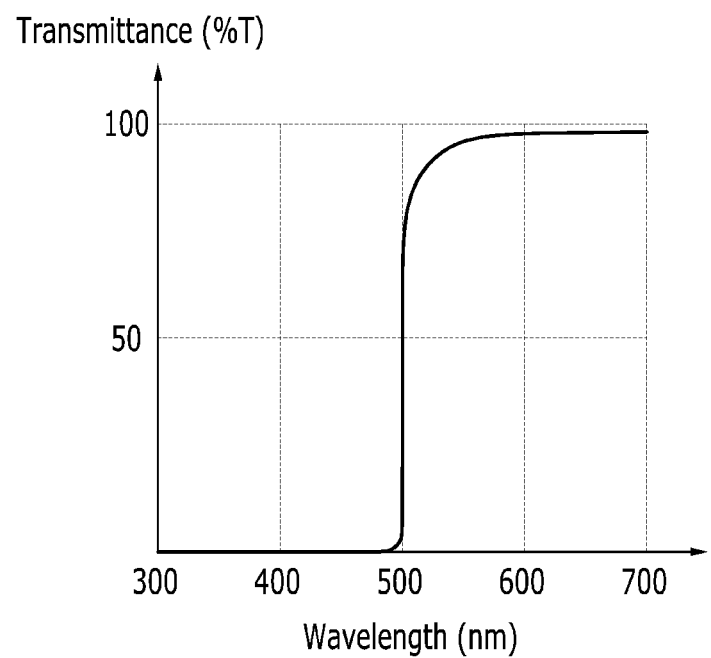
FIG. 2 is a graph showing light characteristics of an exemplary embodiment of a first optical filter layer in the display device of FIG. 1.

FIG. 2 is a graph showing light transmittance depending on a wavelength of a first optical filter layer in the display device of FIG. 1.

Referring to FIG. 2, an exemplary embodiment of the first optical filter layer 30 may substantially block the blue light, for example, a light having a wavelength less than or equal to about 500 nanometers (nm), and may transmit remaining visible light, for example, a light having a wavelength greater than about 500 nm and less than or equal to about 700 nm. In one exemplary embodiment, for example, the remaining visible light having a wavelength greater than about 500 nm and less than or equal to 700 nm may have light transmittance of greater than or equal to about 70%.

In one exemplary embodiment, for example, the color filter 20 of the display device 100 includes a plurality of first regions (PX1) for displaying blue, a plurality of second regions (PX2) for displaying green, and a plurality of third regions (PX3) for displaying red. In such an embodiment, the first optical filter layer 30 may expose (or be disposed not to overlap) the first region (PX1) for displaying blue and disposed on or to overlap the second region (PX2) for displaying green and the third region (PX3) for displaying red. Accordingly, deterioration of display characteristics of the first region (PX1) for displaying blue by the first optical filter layer 30 may be effectively prevented.

In such an embodiment, the first optical filter layer 30 of the display device 100 works as a band-pass filter ("BPF") that blocks light in a wavelength region corresponding to the blue light but passing light in the other wavelength regions, for example, corresponding to a green light, a yellow light, a red light, and the like other than the blue light. In such an embodiment, the first optical filter layer 30 may be a long-wave pass filter ("LWPF") that selectively passes a green light, a yellow light, a red light and the like having a relatively long wavelength region, e.g., a visible light having a wavelength longer than that of a blue light.

In an exemplary embodiment, the first optical filter layer 30 may be, for example, a semi-transmissive layer.

In one exemplary embodiment, for example, the first optical filter layer 30 may have, for example, a distributed Bragg reflection ("DBR") structure. In such an embodiment, the first optical filter layer 30 may include a plurality of layers having different refractive indices, for example, alternately stacked layers having different refractive indices. In one exemplary embodiment, for example, a the first optical filter layer 30 may include first layer 31 having a high refractive index and a second layer 32 having a low refractive index.

The first layer 31 may have, for example, a refractive index (n1) in a range of about 1.8 to about 2.6, for example, about 1.9 to about 2.6. In an exemplary embodiment, the first layer 31 may include, for example, at least one selected from hafnium oxide, tantalum oxide, titanium oxide, zirconium oxide, magnesium oxide, cesium oxide, lanthanum oxide, indium oxide, niobium oxide, aluminum oxide and silicon nitride. The first layer 31 may include at least one of other materials having a refractive index in the above-described range in alternative exemplary embodiments.

The second layer 32 may have, for example, a refractive index (n2) in a range of about 1.3 to about 1.8, for example, about 1.4 to about 1.7. In an exemplary embodiment, the second layer 32 may include, for example, a silicon oxide. The second layer 31 may include at least one of other materials having a refractive index in the above-described range in alternative exemplary embodiments.

As the difference between the refractive index (n1) of the first layer 31 and the refractive index (n2) of the second layer 32 increases, the first optical filter layer 30 may have higher wavelength selectivity.

In an exemplary embodiment, the first layer 31 and the second layer 32 may have a thickness and a number of layers determined by the refractive index and reflection wavelength of each layer. In one exemplary embodiment, for example, the first layer 31 may have a thickness in a range of about 3 nm to about 300 nm, and the second layer 32 may have a thickness in a range of about 3 nm to about 300 nm. In an exemplary embodiment, the first optical filter layer 30 may have a total thickness in a range of about 3 nm to about 10,000 nm. In one exemplary embodiment, for example, the first optical filter layer 30 may have a total thickness in a range of about 300 nm to about 10,000 nm, or for example, about 1000 nm to about 10,000 nm. The first layer 31 may have the same thickness and material as those of the second layer 32.

In such an embodiment, the first optical filter layer 30 has a stacking structure and thus may block a blue light but pass a green light, a red light, and/or a yellow light as a combination thereof except for the blue light out of the visible light.

The blue light blocked from the first optical filter layer 30 may be reflected from the first optical filter layer 30 and thus be optically recycled. The specific composition of the first optical filter layer 30 and an optical recycling effect based thereon will be described later in detail.

In an exemplary embodiment, a light blocking member (BM) is disposed beneath the first optical filter layer 30. The light blocking member (BM) may include or be formed of a material that passes no light, for example, of a metal particle including chromium (Cr), silver (Ag), molybdenum (Mo), nickel (Ni), titanium (Ti), tantalum (Ta), or the like, an oxide thereof, or a combination thereof. The light blocking member (BM) effectively prevents light leakage of the display device 100 and improves contrast. Light blocking members (BM) are disposed to be spaced apart from each other by a predetermined distance, and the color filter 20 is disposed in a space defined between the light blocking members (BM), as shown in FIG. 1.

In an exemplary embodiment, the color filter 20 includes a quantum dot 2 that absorbs light supplied thereto and emits light having other wavelengths. In an exemplary embodiment, the quantum dot 2 may include a first quantum dot 2a that absorbs the first light and emits a second light having a longer wavelength than that of the first light, and a second quantum dot 2b that absorbs the first light and emits a third light having a longer wavelength than those of the first light and the second light.

The shape of the quantum dot 2 is not particularly limited. In one exemplary embodiment, for example, the quantum dot 2 may have a spherical shape as shown in FIG. 1, may have other shapes of a pyramidal shape or a multi-arm shape, or may be a cubic nanoparticle, a nanotube, a nanowire, a nanofiber, or a particle having a nanosheet-like shape.

The color filter 20 may be partitioned into the first region (PX1) that displays the first light, the second region (PX2) that displays the second light, and the third region (PX3) that displays the third light. In an exemplary embodiment, the first region (PX1) may display a blue light as the first light, the second region (PX2) may display a green light as the second light, and the third region (PX3) may display a red light as the third light.

A blue filter may be disposed in the first region (PX1), and the blue filter may be a transparent body 20a that emits the blue light supplied from the light source 10 without changing the wavelength of the blue light.

In an exemplary embodiment, as shown in FIG. 1, the transparent body 20a fills the first region (PX1) entirely and contacts the second substrate (SU2), but heights, sizes, and the like of the transparent body 20a may be variously modified. The transparent body 20a may include scatter-inducing particles that do not change the wavelength of the blue light but that change the moving direction of the blue light.

In an alternative exemplary embodiment, the transparent body 20a may be omitted. In such an embodiment, a hollow may be defined or formed in the first region (PX1).

The second region (PX2) may display a green light, and a green filter 20b that changes the blue light supplied from the light source 10 into a green light may be disposed therein.

The green filter 20b includes the first quantum dot 2a excited by receiving the blue light and then emitting a green light while stabilized in a ground state.

The third region (PX3) displays a red light, and a red filter 20c that changes the blue light supplied from the light source 10 into a red light may be disposed therein.

The red filter 20c includes a second quantum dot 2b excited by receiving the blue light and then emitting red light while stabilized in a ground state.

In an exemplary embodiment, where the blue light supplied from the light source 10 is scattered by scatter-inducing particles in the first quantum dot 2a, the second quantum dot 2b and the transparent layer 20a, and is then externally emitted and displays an image, the emitted light may move in a wide direction and have no grayscale change depending on a position, and accordingly, the display device 100 may have a wide viewing angle.

In an exemplary embodiment, the green filter 20b and the red filter 20c respectively including the quantum dot 2 may be formed by coating a photosensitive composition including a binder, a photopolymerizable monomer, a photoinitiator, and a solvent other than the quantum dot on each of the second region (PX2) and the third region (PX3).

In such an embodiment, the first quantum dot 2a and the second quantum dot 2b may include or be formed of the same material but have different sizes, so that incident blue light may be respectively emitted as a green light and a red light having different wavelengths.

In one exemplary embodiment, for example, the first quantum dot 2a may have a smaller size than the second quantum dot 2b and thus emit a green light (G) having a middle wavelength of about 530±5 nm and a full width at half maximum ("FWHM") from about 40 nm to about 60 nm, that is, relatively high energy. In such an embodiment, the second quantum dot 2b has a larger size than that of the first quantum dot 2a and thus may emit a red light (R) having a wavelength of about 625±5 nm and a FWHM from about 40 nm to about 60 nm, that is, relatively low energy.

The quantum dot is not particularly limited, but may be a known or commercially available quantum dot. In one exemplary embodiment, for example, the quantum dot may include a Group II-VI compound, a Group III-V compound, a Group IV-VI compound, a Group IV compound, or a combination thereof.

The Group II-VI compound may be at least one selected from a binary element compound including CdSe, CdTe, ZnS, ZnSe, ZnTe, ZnO, HgS, HgSe, HgTe, MgSe, MgS, and a mixture thereof; a ternary element compound including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary element compound including HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The Group III-V compound semiconductor may be at least one selected from a binary element including GaN, GaP, GaAs, GaSb, AlN, AlP, AlAs, AlSb, InN, InP, InAs, InSb, and a mixture thereof; a ternary element compound including m GaNP, GaNAs, GaNSb, GaPAs, GaPSb, AlNP, AlNAs, AlNSb, AlPAs, AlPSb, InNP, InNAs, InNSb, InPAs, InPSb, and a mixture thereof; and a quaternary element compound including GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be at least one selected from a binary element compound including SnS, SnSe, SnTe, PbS, PbSe, PbTe, and a mixture thereof; a ternary element compound including SnSeS, SnSeTe, SnSTe, PbSeS, PbSeTe, PbSTe, SnPbS, SnPbSe, SnPbTe, and a mixture thereof; and a quaternary element compound including SnPbSSe, SnPbSeTe, SnPbSTe, and a mixture thereof.

The Group IV compound may be selected from a singular element compound including Si, Ge, and a mixture thereof; and a binary element compound including SiC, SiGe, and a mixture thereof.

In such an embodiment, the binary element compound, the ternary element compound, or the quaternary element compound may be present with a uniform concentration in a particle, or may be present with a locally different concentration in a single particle. The quantum dot 2 may have a core-shell structure, in which a quantum dot 2 surrounds another (different) quantum dot 2. The interface of the core and the shell may have a concentration gradient such that the concentration of the element(s) of the shell decreases toward the core. The quantum dot may have a single core of a quantum dot and multi-shells surrounding the core. The multi-layered shell structure has at least two shells, each of which may be a single composition, an alloy, or have a concentration gradient.

In an exemplary embodiment, the materials of the shell of the quantum dot may have a higher energy bandgap than that of the core, and thereby the quantum dot may exhibit a quantum confinement effect more effectively. In an exemplary embodiment, where the quantum dot 2 is a multi-shell type of quantum dot particle, the bandgap of the material of an outer shell may be higher energy than that of the material of an inner shell (a shell that is closer to the core). In such an embodiment, the quantum dot may emit light of a wavelength ranging from ultraviolet (UV) to infrared light.

The quantum dot may have quantum efficiency greater than or equal to about 10%, for example, greater than or equal to about 30%, greater than or equal to about 50%, greater than or equal to about 60%, greater than or equal to about 70%, or greater than or equal to about 90%.

In an exemplary embodiment, a second optical filter layer 40 is disposed on a side of the color filter 20. The second optical filter layer 40 may be disposed to cover overran entire surface of the upper panel 12.

In one exemplary embodiment, for example, the second optical filter layer 40 may include a plurality of layers having different refractive indices. In one exemplary embodiment, for example, the second optical filter layer 40 may include alternately stacked layers having different refractive indices. In such an embodiment, one layer of the plurality of layers includes a material having a high refractive index and another layer of the plurality of layers includes a material having a low refractive index.

In an exemplary embodiment, a layer having a high refractive index of the second optical filter layer 40 may include, for example, at least one selected from hafnium oxide, tantalum oxide, titanium oxide, zirconium oxide, magnesium oxide, cesium oxide, lanthanum oxide, indium oxide, niobium oxide, aluminum oxide and silicon nitride, but not being limited thereto. Alternatively, the layer having a high refractive index of the second optical filter layer 40 may include various other materials having higher refractive indices that the layer having a low refractive index according to embodiments.

In an exemplary embodiment, a layer having a low refractive index of the second optical filter layer 40 may, for example, include a silicon oxide, but not being limited thereto. Alternatively layer having a low refractive index of the second optical filter layer 40 may include various other materials having a lower refractive index than a layer having a high refractive index.

In such an embodiment, as the difference between the refractive indices of the layer having a high refractive index and the layer having a low refractive index increases, the second optical filter layer 40 may have higher wavelength selectivity.

In an exemplary embodiment, a thickness and a number of layers of the layer having a high refractive index and the layer having a low refractive index may be determined by the refractive index and reflection wavelength of each layer. In one exemplary embodiment, for example, the layer having a high refractive index may have a thickness in a range of about 3 nm to about 300 nm, and the layer having a low refractive index may have a thickness in a range of about 3 nm to about 300 nm. The second optical filter layer 40 may have a total thickness, for example, in a range of about 3 nm to about 10,000 nm, in a range of about 300 nm to about 10,000 nm, or in a range of about 1000 nm to about 10,000 nm. In the second optical filter layer 40, the layer having a high refractive index and the layer having a low refractive index may have the same or different thicknesses, and may include or be formed of the same or different materials.

In an exemplary embodiment, the second optical filter layer 40 may pass a blue light in a wavelength region less than or equal to about 500 nm but reflect light in a wavelength region greater than about 500 nm, that is, a green light, a yellow light, a red light and the like. The second optical filter layer 40 may have a reflectance greater than or equal to about 60%, for example, greater than or equal to about 80%, of light in the wavelength region of greater than about 500 nm.

Figure 3:
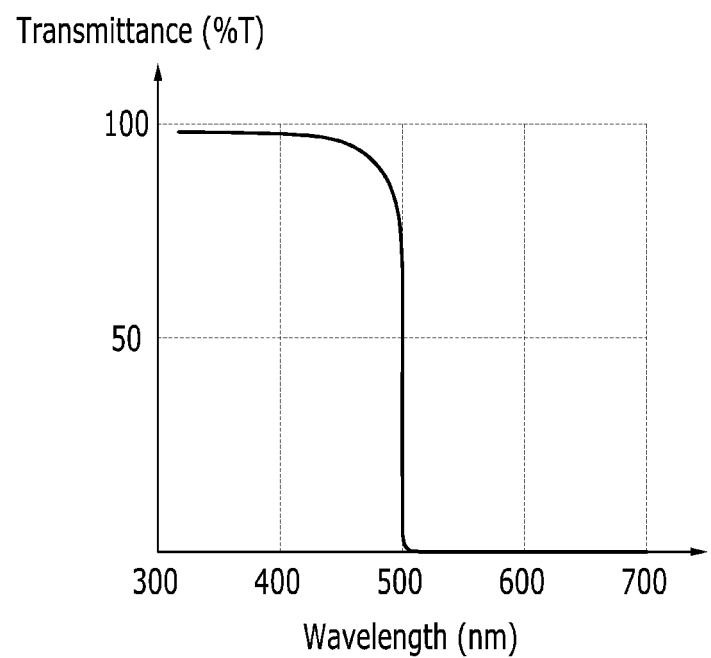
FIG. 3 is a graph showing light characteristics of an exemplary embodiment of a second optical filter layer in the display device of FIG. 1.

FIG. 3 is a graph showing light characteristics of an exemplary embodiment of a second optical filter layer in the display device of FIG. 1.

Referring to FIG. 3, an exemplary embodiment of the second optical filter layer 40 may substantially transmit a blue light, for example, light having a wavelength less than or equal to about 500 nm, and may reflect remaining visible light, for example, light having a wavelength greater than about 500 nm and less than or equal to 700 nm. In one exemplary embodiment, for example, the second optical filter layer 40 may have a light transmittance greater than or equal to about 70% with respect to the blue light having a wavelength less than or equal to 500 nm.

In an exemplary embodiment, the second optical filter layer 40 may function as a BPF that selectively passes a wavelength region corresponding to a blue light. In such an embodiment, the second optical filter layer 40 blocks a wavelength region outside the blue light, for example, a wavelength region corresponding to a green light, a yellow light, a red light, and the like, and thus may function as a short-wave pass filter ("SWPF").

Accordingly, the green light, the yellow light, the red light and the like may not pass the second optical filter layer 40 but may be reflected toward the first optical filter layer 30 and thus be optically recycled.

FIG. 1 shows an exemplary embodiment having a stacking structure in which the first optical filter layer 30, the color filter layer 20 and the second optical filter layer 40 are sequentially stacked from the top. In such an embodiment, the stacking structure may be positioned in the upper panel 12, but not being limited thereto. Alternatively, the stacking structure may be various positioned between the first substrate (SU1) and the second substrate (SU2) depending on a method of driving a display device, an environment for using the device, and the like.

In one exemplary embodiment, for example, the stacking structure may be positioned between the liquid crystal layer (LC) and the first substrate (SU1). In such an embodiment, the lower panel 11 includes the stacking structure, and may distinguish the first light supplied from the light source 10 into first light, second light and third light.

In an exemplary embodiment, the stacking structure may function as a type of optical resonator due to the first optical filter layer 30 and the second optical filter layer 40. In such an embodiment, light respectively reflected from the first optical filter layer 30 and the second optical filter layer 40 may be repeatedly reflected between the first optical filter layer 30 and the second optical filter layer 40 and resonated. In such an embodiment, light reinforced and interfered with through the resonance may finally pass the first optical filter layer 30.

Accordingly, such a stacking structure will hereinafter be referred to as a microcavity structure.

In an exemplary embodiment, a second polarizer (POL2) is disposed on (e.g., adhered under) the second optical filter layer 40. The second polarizer (POL2) may include a polarizing element and a protective layer, and the protective layer may include TAC. An insulation layer (not shown) may be disposed between the second polarizer (POL2) and the common electrode (CE), and electrically insulates the second polarizer POL2 from the common electrode (CE). In an exemplary embodiment, the second polarizer (POL2) may be disposed below (e.g., on an inner surface of) the second optical filter layer 40 but not being limited thereto. In an alternative exemplary embodiment, the second polarizer (POL2) may be disposed in the upper panel 12, for example, on top of or beneath the color filter 20, or may be omitted.

Hereinafter, referring to FIG. 4, the principle and effect of the microcavity structure defined based on the first optical filter layer 30 and the second optical filter layer 40 will be described.

Figure 4:
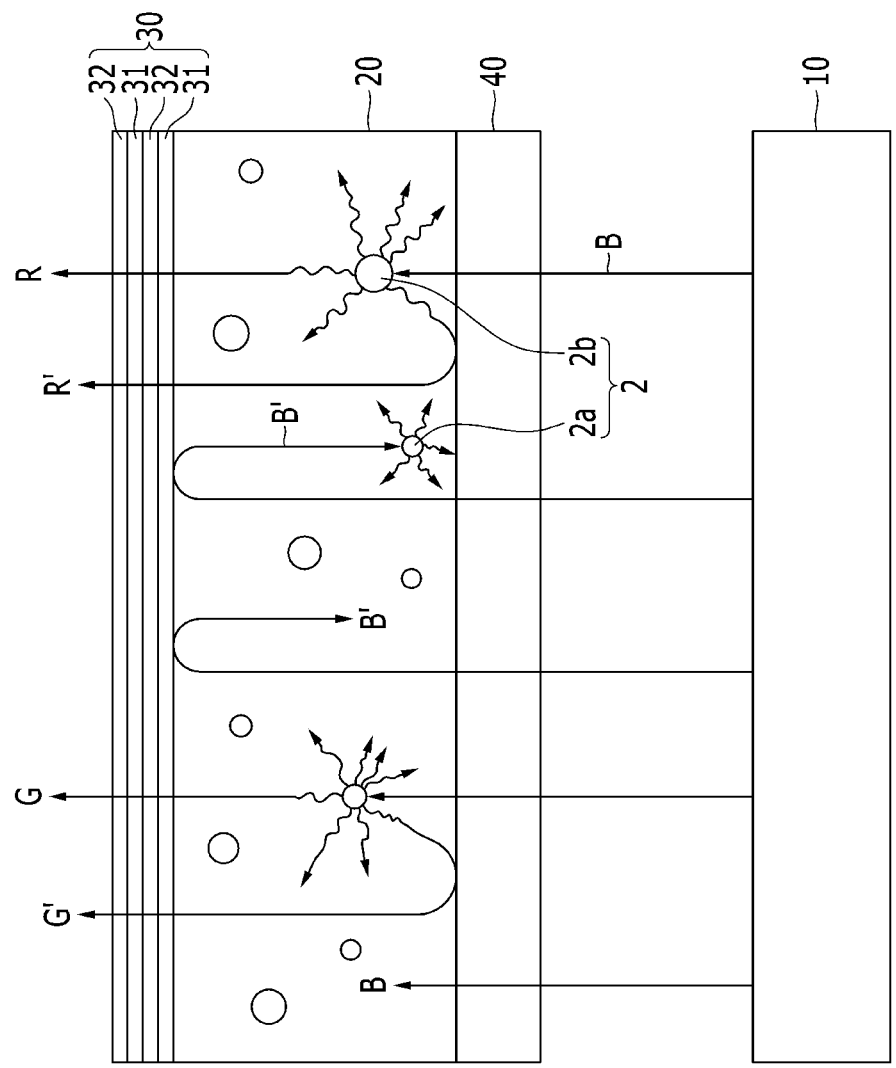
FIG. 4 is a cross-sectional view showing a microcavity structure defined collectively by a color filter in FIG. 1, the first optical filter layer, and the second optical filter layer, and a microcavity effect generated due to the microcavity structure.

FIG. 4 is a cross-sectional view showing the microcavity structure defined collectively by the color filter, the first optical filter layer, and the second optical filter layer in FIG. 1, and a microcavity effect due to the microcavity structure.

FIG. 4 schematically shows the color filter 20 without partitioning the first region (PX1) to the third region (PX3) to illustrate the microcavity structure and an effect thereof, in an exemplary embodiment where a plurality of quantum dots 2 including the first quantum dot 2a and the second quantum dot 2b having different sizes are included in the color filter 20.

Referring to FIG. 4, the first optical filter layer 30, the color filter 20 and the second optical filter layer 40 are sequentially disposed, and the light source 10 that emits the blue light (B) is disposed below the second optical filter layer 40.

In such an embodiment, the plurality of quantum dots 2 of the color filter 20 is excited by the blue light (B) supplied from the light source 10 through the second optical filter layer 40, and then emit light having a particular wavelength while stabilized in a ground state. In such an embodiment, each quantum dot 2 has a discontinuous energy bandgap due to a quantum confinement effect, and thus the display device 100 may display an image having high color purity.

In such an embodiment, the quantum dot 2 has anisotropic optical radiation characteristics. Accordingly, the quantum dot 2 may radiate light in various directions as shown in FIG. 4. In such an embodiment, since light emitted from the quantum dot 2 is radiated not in a particular direction but in a random direction, photo-efficiency may be deteriorated. In an exemplary embodiment, the display device 100 may have a microcavity structure that amplifies and resonates light emitted from the quantum dot 2 and thus emits the resonated light, thereby improving photo-efficiency.

The microcavity structure amplifies and emits light having a particular wavelength by repeatedly reflecting light between a reflection layer and a semi-reflection layer spaced apart from each other with a distance determined based on an optical length, and is called a Fabry-Perot interferometer or a Fabry-Perot resonator, and such light-amplifying effect is called a microcavity effect or a Fabry-Perot multi-beam effect. In an exemplary embodiment, the first optical filter layer 30 may function as a semi-transmission layer, and the second optical filter layer 40 may function as a reflection layer.

In an exemplary embodiment, assuming that the blue light incident into the color filter 20 is absorbed therein at a zero rate, that light emitted from the inside of the color filter 20 is a plane wave having high coherence, and that light radiated through the quantum dot 2 has the same magnitude, the incident light is multi-reflected on the interface of the first optical filter layer 30 and the color filter 20 and on the interface of the second optical filter layer 40 and the color filter 20, and emitted out of the microcavity structure due to the microcavity effect thereof.

In an exemplary embodiment, the first quantum dot 2a is excited when the blue light (B) enters the first quantum dot 2a, and then emits the green light in a radiation direction while stabilized in a ground state. In such an embodiment, as shown in FIG. 4, when the green light is emitted from the first quantum dot 2a, a part of the radiated green light may directly pass through the first optical filter layer 30, but the rest of the light is reflected on the surface of the second optical filter layer 40, the optical length thereof is changed, and accordingly, the reflected light heads toward the first optical filter layer 30 or collides with other first quantum dots 2a and other second quantum dots 2b inside the color filter 20 and is thus reflected and refracted.

The first optical filter layer 30 may emit light around a wavelength corresponding to a resonance wavelength of microcavity, for example, a phase of 2πrn (n is an integer), but may re-reflect light at other phases toward the second optical filter layer 40 when other green light portions except directly-passing green light (G) reach the first optical filter layer 30. The re-reflected light goes back and forth between the first optical filter layer 30 and the second optical filter layer 40 until the light has a phase of 2πn when the light reaches the first optical filter layer 30 and is finally emitted as amplified green light (G'). In such an embodiment, as shown in FIG. 4, the amplified green light (G') amplified through reinforcement and interference due to the microcavity effect is emitted along with the directly-passing green light (G) and thus may improve photo-efficiency of the green light.

As for a red light, the amplified red light (R') amplified through reinforcement and interference due to the microcavity effect is emitted along with directly-passed red light (R) and thus may improve photo-efficiency of the red light.

In an exemplary embodiment, the amplified green light (G') and the red light (R') may be amplified based on a Fabry-Perot multi-beam interference, a dual-beam interference or a combination thereof. In such an embodiment, multi-light or dual light may be amplified through reinforcement and interference and emitted as one light, or the multi-beam or dual beam interference may simultaneously occur and lead to amplification.

In such an embodiment, since portions of a green light and a red light conventionally considered as an optical loss due to anisotropic optical radiation characteristics by the quantum dot 2 may be reflected and amplified and then emitted as shown in FIG. 4, the green light and the red light may be optically recycled due to the microcavity structure.

In such an embodiment, the blue light not entering the quantum dot 2 but going straight toward the first optical filter layer 30 is reflected on the surface of the first optical filter layer 30. A part of the reflected blue light (B') may enter the first quantum dot 2a or the second quantum dot 2b when reflected back to the second optical filter layer 40. Accordingly, a part of the blue light (B') reflected by the first optical filter layer 30 passes the second optical filter layer 40 again and may not go back to the light source 10 but excites the quantum dot 2 and thus optically recycles the blue light.

Hereinafter, referring to FIG. 5, the microcavity effect through the first optical filter layer 30 and the second optical filter layer 40 will be described in detail by partitioning the color filter 20 into regions.

Figure 5:
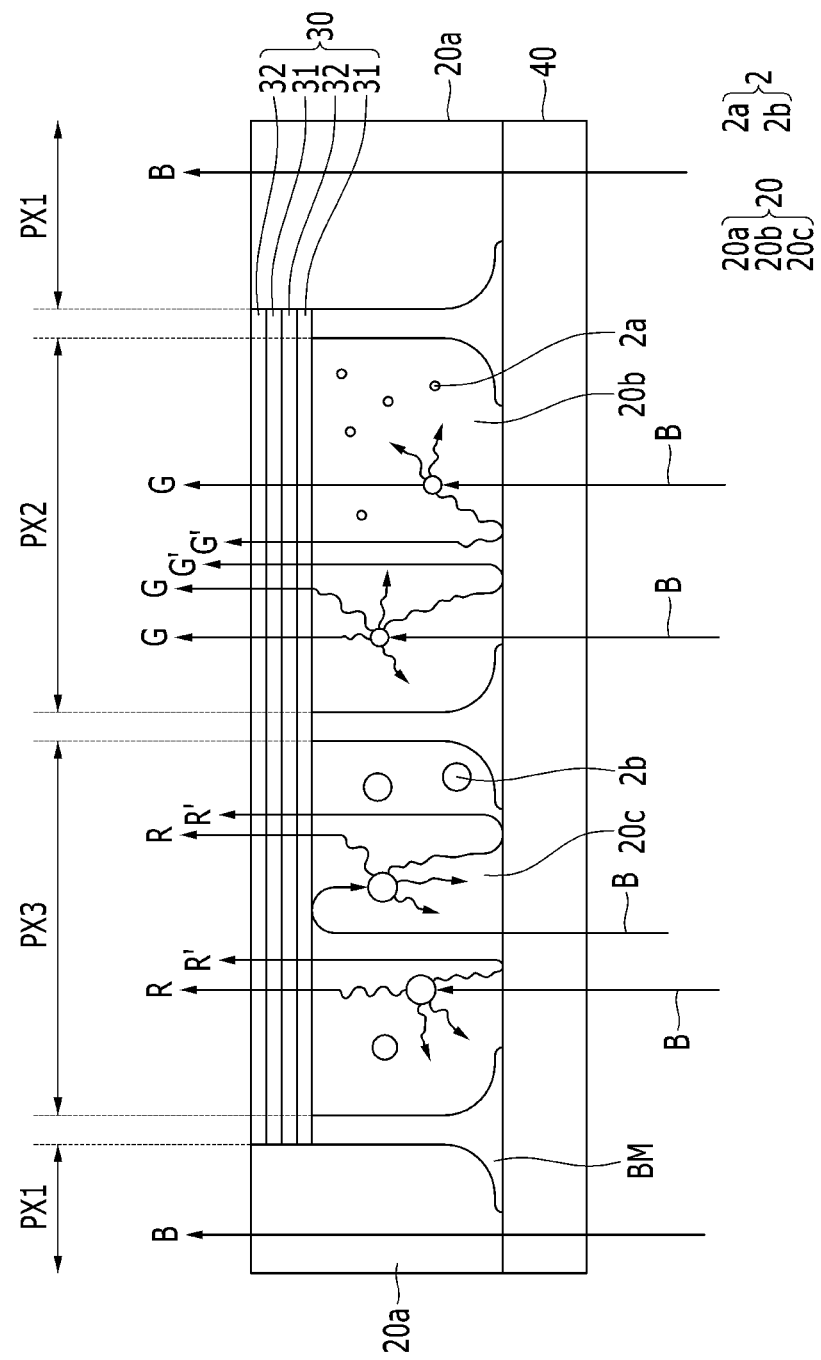
FIG. 5 is a cross-sectional view showing first to third regions of the color filter of FIG. 4 when the color filter is partitioned into three regions.

FIG. 5 is a cross-sectional view specifically showing first to third regions of the color filter of FIG. 4.

Referring to FIG. 5, in an exemplary embodiment, the color filter 20 of the display device 100 is partitioned into the first region (PX1) for displaying blue light, the second region (PX2) for displaying green light, and the third region (PX3) for displaying a red light, unlike the schematic structure of FIG. 4, and the first to third color filters are disposed in a region corresponding thereto.

The first region (PX1) of the color filter 20 has no microcavity effect, since only the second optical filter layer 40 that functions as a reflection layer is provided, and the first optical filter layer 30 that functions as a semi-transmission layer is not provided. Accordingly, a blue may be displayed in the first region (PX1), since blue light supplied from the light source 10 is not resonated but passes through the transparent blue filter 20a.

In such an embodiment, the second region (PX2) and the third region (PX3) may each have a microcavity structure formed by the first optical filter layer 30 that functions as a semi-transmission layer and the second optical filter layer 40 that functions as a reflection layer. As shown in FIG. 5, the green light and the red light respectively resonate inside the green filter 20b and the red filter 20c.

The second region (PX2) may display a green color through the green light (G) and the amplified green light (G') amplified through resonance, and the third region (PX3) may display a red color through the red light (R) and red light (R') amplified through resonance.

The green and red displayed by the display device 100 are obtained by adding each green and red directly emitted from the quantum dot 2 as described above (spontaneous emission), each amplified green and amplified red, which are amplified through reinforcement and interference of multi-emitted light due to a microcavity structure (Fabry-Perot multi-beam interference), and each green and red that are amplified through reinforcement and interference of duel emitted light due to the microcavity structure (duel beam interference). Accordingly, in such an embodiment, the display device 100 may have about 80% to about 300%, for example, about 170% to about 300%, or for example, about 170% to about 250% improved photo-efficiency when compared with a conventional display device having no microcavity structure.

The green and red displayed by the display device 100 relate to an optical length, and thus spectral radiance of the green light and the red light finally passing through a microcavity structure may be changed by adjusting a distance between a reflection layer and a semi-transmission layer including the microcavity structure.

In one exemplary embodiment, for example, as shown in FIG. 5, the green filter 20b and the red filter 20c may have the same thickness or different thicknesses determined based on an optimal resonant distance corresponding to each wavelength, and the optimal resonant distance corresponding to each wavelength between the first optical filter layer 30 and the color filter 20 or between the second optical filter layer 40 and the color filter 20 may be reinforced by forming each resonant reinforcement layer having various thicknesses.

In an exemplary embodiment, the color filter 20 is partitioned into each region by a light blocking member (BM), and thus may block light resonating between the first optical filter layer 30 and the second optical filter layer 40 from intrusion into the other regions and prevent a color mixture of red, green, and blue from being displayed by the display device 100.

In such an embodiment, the first optical filter layer 30 that blocks blue light is disposed in the second region (PX2) and the third region (PX3), and may effectively prevent a color mixture of the blue light with green and red. In such an embodiment, the display device 100 may have an improved color gamut with respect to green and red colors.

In an exemplary embodiment, where the display device 100 includes the quantum dot 2 in the color filter 20 and displays an image when light supplied from the light source 10 is scattered by the quantum dot 2 and emitted outside, as described above, the light may be emitted in a wide direction and have no grayscale change depending on a position. Accordingly, in such an embodiment, the display device 100 may have a wide viewing angle.

In an exemplary embodiment, the display device 100 may have improved photo-efficiency through a microcavity structure by disposing the first optical filter layer 30 and the second optical filter layer 40 with the color filter 20 in the middle to form the microcavity structure, even when the color filter 20 includes the quantum dot 2 having anisotropic optical radiation characteristics. In such an embodiment, the display device 100 may have improved photo-efficiency relative to power consumption.

Hereinafter, referring to FIGS. 6 to 8, various alternative exemplary embodiments of the display device 100 will be described. Hereinafter, any repetitive detailed description of the same constituents of the alternative exemplary embodiments as in the display device 100 of FIG. 1 will be omitted.

Figure 6:
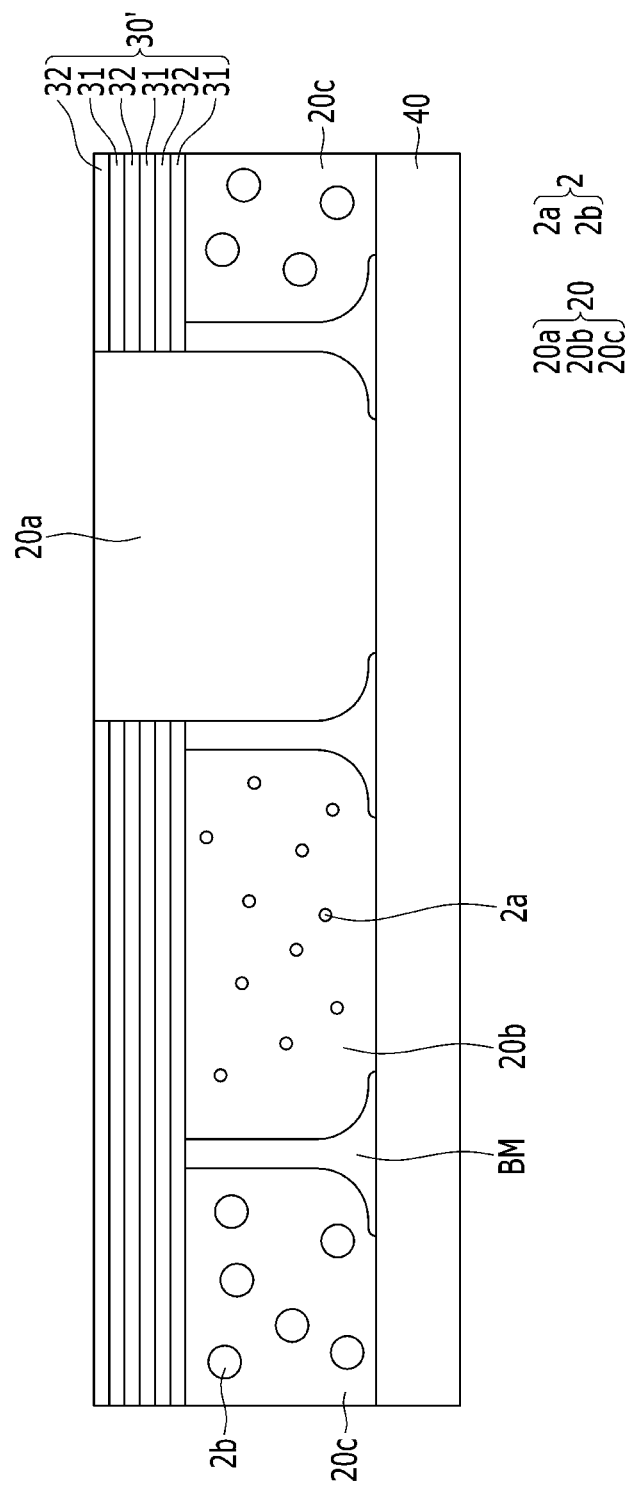
FIG. 6 is a cross-sectional view showing an alternative exemplary embodiment of the first optical filter layer in the display device of FIG. 1.

FIG. 6 is a cross-sectional view showing an alternative exemplary embodiment of a first optical filter layer in the display device of FIG. 1.

Referring to FIG. 6, a first optical filter layer 30' may have a stacking structure in which a first layer 31 having a high refractive index and a second layer 32 having a low refractive index are alternately stacked one on another such that the stacking structure may have up to about 10 layers but at least about 4 layers, for example, about 5 layers.

Figure 7:
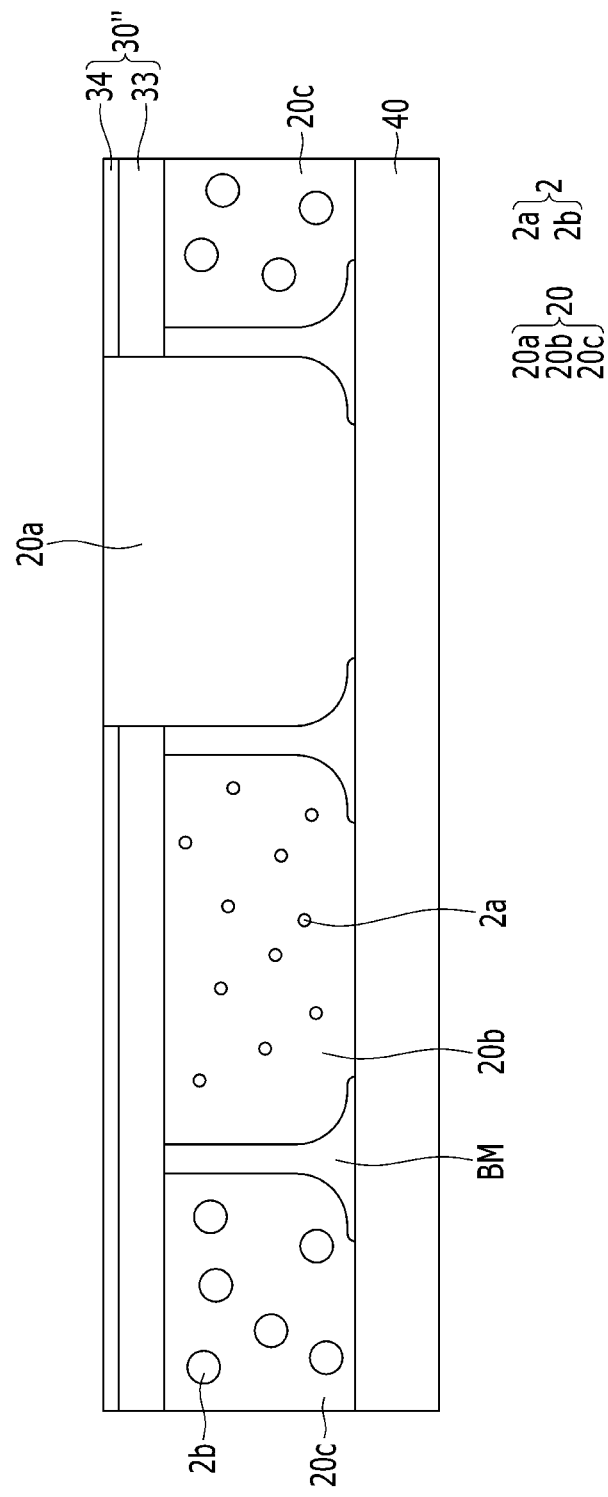
FIG. 7 is a cross-sectional view showing another alternative exemplary embodiment of the first optical filter layer in the display device of FIG. 1.

FIG. 7 is a cross-sectional view showing another alternative exemplary embodiment of the first optical filter layer in the display device of FIG. 1.

Referring to FIG. 7, the first optical filter layer 30" may have, for example, a half mirror structure. In one exemplary embodiment, for example, the first optical filter layer 30" may have a structure including a thin film 34 disposed on a substrate 33.

The substrate 33 may include at least one selected from a silicon oxide, an acryl, a polycarbonate, polyethylene terephthalate, polyethylene naphthalate, and glass. Alternatively, the substrate 33 may include or be made of other various transparent materials.

The thin film 34 may be disposed on a surface or both of opposing surfaces of the substrate 33. This thin film 34 has a mirror effect, and thus may selectively pass a part of reinforced and interfered light out of light reaching the first optical filter layer 30" and reflect the remaining part of light.

The thin film 34 on the surface of the substrate 33 may include a metal, a conductive oxide or a combination thereof. The metal may include at least one selected from aluminum (Al), silver (Ag), nickel (Ni), and chromium (Cr), and the conductive oxide may include at least one selected from indium tin oxide, aluminum zinc oxide, potassium zinc oxide, and indium zinc oxide.

However, the thickness and material of the substrate 33 and the thin film 34, the density of the thin film 34, and the like may variously modified in a way, such that a first optical filter layer 30" blocks a wavelength of less than or equal to about 500 nm corresponding to a blue light but passes a wavelength of greater than about 500 nm, as shown in FIG. 2.

Figure 8:
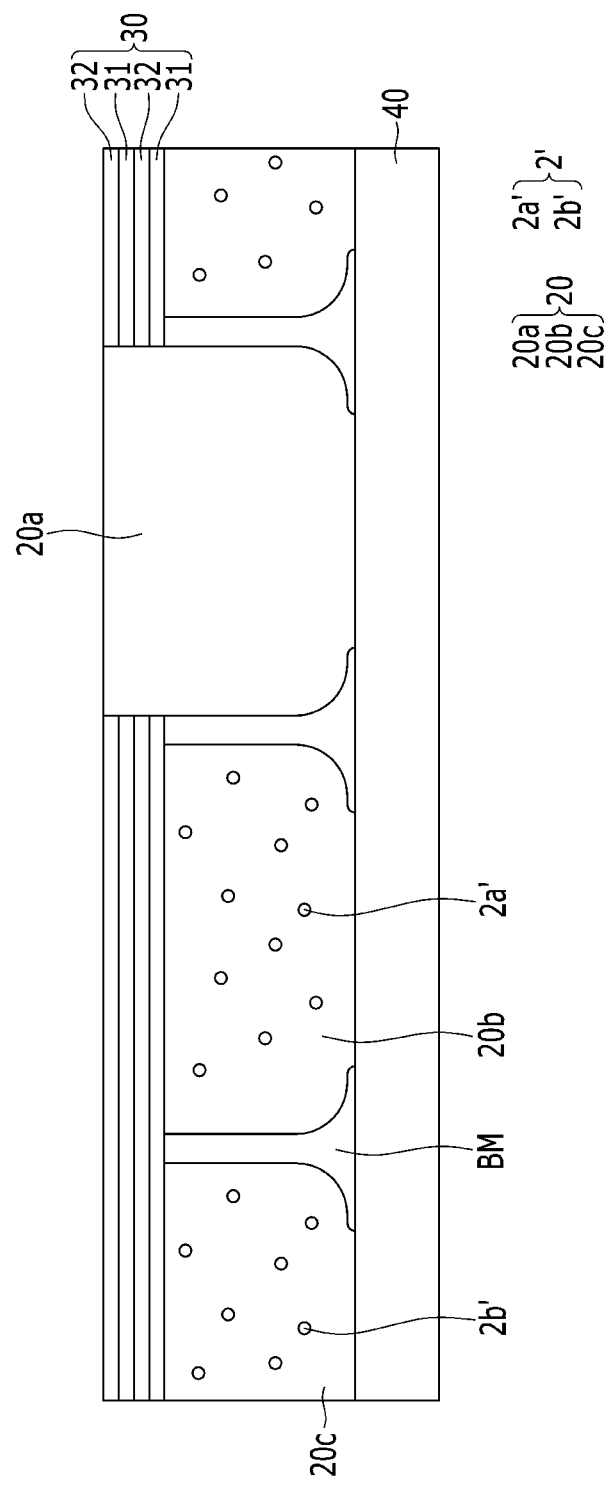
FIG. 8 is a cross-sectional view showing an exemplary variation of a quantum dot in the display device of FIG. 1.

FIG. 8 is a cross-sectional view showing another alternative exemplary embodiment of the first optical filter layer, in which the first quantum dot and the second quantum dot have the same size in FIG. 1.

In an exemplary embodiment, as shown in FIG. 8, a first quantum dot 2a' and a second quantum dot 2b' may have the same size as each other. In such an embodiment, the color filter 20 includes a plurality of quantum dots 2' having the same size. Herein, the first quantum dot 2a' and the second quantum dot 2b' may include or be formed of different materials in the second region (PX2) and the third region (PX3).

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An optical stacking structure comprising:
   a color filter comprising a plurality of quantum dots which absorbs first light and emits at least one of second light and third light, wherein the second light and the third light are different from the first light;
   a first optical filter layer disposed on the color filter, wherein the first optical filter blocks at least a part of the first light; and
   a second optical filter layer disposed on the opposite side of the first optical filter based on the color filter, wherein the second optical filter transmits at least a part of the first light and reflects at least a part of the second light and the third light,
   wherein
   the first optical filter layer, the color filter and the second optical filter layer are sequentially stacked one on another,
   the first optical filter layer functions as a semi-transmission layer so that the first optical filter layer emits light around a wavelength corresponding to a resonance wavelength of a microcavity structure defined collectively by the first optical filter layer, the color filter and the second optical filter layer, and
   the second optical filter layer functions as a reflection layer so that light, except for the light around the wavelength corresponding to the resonance wavelength of the microcavity structure, goes back and forth between the first optical filter layer and the second optical filter layer.

2. The optical stacking structure of claim 1, wherein the color filter comprises:
   a first region which emits the first light;
   a second region which emits the second light; and
   a third region which emits the third light,
   wherein the first optical filter layer is disposed at a region corresponding to the second region and the third region.

3. The optical stacking structure of claim 2, wherein the first region comprises a transparent body.

4. The optical stacking structure of claim 2, wherein the second optical filter layer is disposed at a region corresponding to the first region, the second region, and the third region.

5. The optical stacking structure of claim 1, further comprising:
   a first substrate; and
   a second substrate disposed opposite to the first substrate,
   wherein the first optical filter layer, the color filter and the second optical filter layer are disposed between the first substrate and the second substrate.

6. The optical stacking structure of claim 1, wherein the quantum dots comprise:
   a plurality of first quantum dots which absorbs the first light and emits the second light having a longer wavelength than the first light; and
   a plurality of second quantum dots which absorbs the first light and emits the third light having a longer wavelength than the first light and the second light.

7. The optical stacking structure of claim 6, wherein the first quantum dots and the second quantum dots have different sizes from each other.

8. The optical stacking structure of claim 1, wherein the first optical filter layer transmits light having a longer wavelength than the first light.

9. The optical stacking structure of claim 1, wherein the first optical filter layer blocks light having a wavelength less than or equal to about 500 nanometers.

10. The optical stacking structure of claim 1, wherein
the first light is a blue light,
the second light is a green light, and
the third light is a red light.

11. The optical stacking structure of claim 1, wherein
the first optical filter layer has a multi-layered structure, and
the multi-layered structure comprises:
a first layer having a high refractive index; and
a second layer having a low refractive index and disposed on the first layer.

12. The optical stacking structure of claim 11, wherein the number of the layers in the multi-layered structure is equal to or greater than four.

13. The optical stacking structure of claim 11, wherein the first layer has a refractive index in a range of about 1.8 to about 2.6.

14. The optical stacking structure of claim 11, wherein the second layer has a refractive index in a range of about 1.3 to about 1.8.

15. The optical stacking structure of claim 11, wherein the first layer comprises at least one selected from hafnium oxide, tantalum oxide, titanium oxide, zirconium oxide, magnesium oxide, cesium oxide, lanthanum oxide, indium oxide, niobium oxide, aluminum oxide, and silicon nitride.

16. The optical stacking structure of claim 11, wherein the second layer comprises a silicon oxide.

17. The optical stacking structure of claim 1, wherein the first optical filter layer comprises:
a film comprising at least one selected from a metal, a conductive oxide and a combination thereof.

18. The optical stacking structure of claim 16, wherein
the metal comprises at least one selected from aluminum silver, nickel, and chromium, and
the conductive oxide comprises at least one selected from indium tin oxide, aluminum zinc oxide, gallium zinc oxide and indium zinc oxide.

19. The optical stacking structure of claim 1, wherein the second optical filter layer has a reflectance greater than or equal to about 60% to light having a wavelength greater than about 500 nanometers.

20. The optical stacking structure of claim 1, wherein the second optical filter layer has a light transmittance greater than or equal to about 70% to light having a wavelength greater than about 500 nanometers.

21. The optical stacking structure of claim 1, wherein the first optical filter has a light transmittance greater than or equal to about 70% to light having a wavelength greater than about 500 nanometers and less than or equal to 700 nanometers.

22. The optical stacking structure of claim 11, wherein the first optical filter has a light transmittance greater than or equal to about 70% to light having a wavelength greater than about 500 nanometers and less than or equal to 700 nanometers.

23. The optical stacking structure of claim 1, wherein the first optical filter layer and the second optical filter layer are spaced apart from each other with a distance determined based on an optical length.

* * * * *